(12) United States Patent
Wang

(10) Patent No.: US 11,428,849 B2
(45) Date of Patent: Aug. 30, 2022

(54) COMPOSITE FILM WITH ANTI-REFLECTIVE COATING

(71) Applicant: SAINT-GOBAIN PERFORMANCE PLASTICS CORPORATION, Solon, OH (US)

(72) Inventor: Yongzhong Wang, Tucson, AZ (US)

(73) Assignee: SAINT-GOBAIN PERFORMANCE PLASTICS CORPORATION, Solon, OH (US)

(*) Notice: Subject to any disclaimer, the term of this patent is extended or adjusted under 35 U.S.C. 154(b) by 0 days.

(21) Appl. No.: 16/716,008

(22) Filed: Dec. 16, 2019

(65) Prior Publication Data

US 2020/0209435 A1 Jul. 2, 2020

Related U.S. Application Data

(60) Provisional application No. 62/786,754, filed on Dec. 31, 2018.

(51) Int. Cl.
| | |
|---|---|
| *G02B 1/115* | (2015.01) |
| *B32B 27/08* | (2006.01) |
| *B32B 7/023* | (2019.01) |
| *B32B 27/30* | (2006.01) |

(52) U.S. Cl.
CPC ............ *G02B 1/115* (2013.01); *B32B 7/023* (2019.01); *B32B 27/08* (2013.01); *B32B 27/308* (2013.01); *B32B 2307/412* (2013.01); *B32B 2309/105* (2013.01)

(58) Field of Classification Search
CPC ............ G02B 1/11–116; B32B 27/304; C09D 183/04–183/12; C09D 127/12–127/20; C08L 83/04–83/12; C08L 27/16–27/20
See application file for complete search history.

(56) References Cited

U.S. PATENT DOCUMENTS

| | | | |
|---|---|---|---|
| 5,139,879 A | 8/1992 | Aharoni et al. | |
| 5,981,059 A | 11/1999 | Bright et al. | |
| 6,245,428 B1 | 6/2001 | Port et al. | |
| 2003/0012936 A1 | 1/2003 | Draheim et al. | |
| 2003/0077437 A1 | 4/2003 | Nakamura et al. | |
| 2003/0116270 A1* | 6/2003 | Hawa | G02F 1/133502 156/307.1 |
| 2005/0147809 A1 | 7/2005 | Hongo et al. | |
| 2007/0286993 A1 | 12/2007 | Radcliffe et al. | |

(Continued)

FOREIGN PATENT DOCUMENTS

| | | | | |
|---|---|---|---|---|
| WO | WO-2012069767 A1 * | 5/2012 | | G02B 1/115 |
| WO | WO-2018199034 A1 * | 11/2018 | | C09D 7/20 |

OTHER PUBLICATIONS

Machine translation of WO2012/069767. Retrieved Jan. 12, 2021.*
International Search Report and Written Opinion for PCT/US2019/066601, dated Apr. 17, 2020, 10 pages.

*Primary Examiner* — Prashant J Khatri
(74) *Attorney, Agent, or Firm* — Abel Schillinger, LLP; Chi Suk Kim

(57) ABSTRACT

A composite film may include a first transparent substrate and a first anti-reflective coating overlying a first surface of the first transparent substrate. The first anti-reflective coating may include fluorothermoplastic material and an acrylated polydimethylsiloxane. The composite film may further have a VLT of at least about 93.0% and a haze value of not greater than about 2.0%.

16 Claims, 8 Drawing Sheets

(56) References Cited

U.S. PATENT DOCUMENTS

2010/0165276 A1    7/2010   David et al.
2010/0311868 A1   12/2010   Bekiarian et al.
2013/0084442 A1    4/2013   Akutagawa et al.
2020/0056031 A1*   2/2020   Kobayashi ............... C09D 7/45

* cited by examiner

COMPOSITE FILM WITH ANTI-REFLECTIVE COATING

CROSS-REFERENCE TO RELATED APPLICATION(S)

This Application claims priority under 35 U.S.C. § 119(e) to U.S. Provisional Patent Application No. 62/786,754, entitled "COMPOSITE FILM WITH ANTI-REFLECTIVE COATING," by Yongzhong WANG, filed Dec. 31, 2018, which is assigned to the current assignee hereof and is incorporated herein by reference in its entirety.

FIELD OF THE DISCLOSURE

The present disclosure relates to a composite film. In particular, the present disclosure relates to a composite film having an anti-reflective coating with particular solar energy and optical characteristics.

BACKGROUND

Composite films can be used as coverings applied to various glass components to strength the glass and to control the passage of solar radiation through transmission, reflection, and absorption. For certain composite film applications, such as, for example, applications on or coverings of medical glass components including medical hoods, protective shields and protective glasses, the composite films must exhibit high visible light transmittance ("VLT"), a low haze value and a low reflectance. This combination of features is of great importance for particular systems. As such, a continuing need exists for improved composite films to use in such applications.

SUMMARY

According to a first aspect, a composite film may include a substrate and a first anti-reflective coating overlying a first surface of the substrate. The first anti-reflective coating may include fluorothermoplastic material and an acrylated polydimethylsiloxane. The composite film may further have a VLT of at least about 93.0% and not greater than about 99.5%.

According to yet another aspect, a composite film may include a substrate and a first anti-reflective coating overlying a first surface of the substrate. The first anti-reflective coating may include fluorothermoplastic material and an acrylated polydimethylsiloxane. The composite film may further have a haze value of at least about 0.5% and not greater than about 2.0%.

According to yet another aspect, a composite film may include a substrate and a first anti-reflective coating overlying a first surface of the substrate. The first anti-reflective coating may include a fluorothermoplastic material at a concentration of at least about 90.00 wt. % and not greater than about 99.50 wt. % for a total weight of the first anti-reflective coating. The first anti-reflective coating may further include an acrylated polydimethylsiloxane at a concentration of at least about 0.10 wt. % and not greater than about 5.00 wt. % for a total weight of the first anti-reflective coating.

BRIEF DESCRIPTION OF THE DRAWINGS

Embodiments are illustrated by way of example and are not limited to the accompanying figures.

Figure 1:
FIG. 1 includes an illustration of an example composite film according to certain embodiments described herein.

Skilled artisans appreciate that elements in the figures are illustrated for simplicity and clarity and have not necessarily been drawn to scale.

DETAILED DESCRIPTION

The following discussion will focus on specific implementations and embodiments of the teachings. The detailed description is provided to assist in describing certain embodiments and should not be interpreted as a limitation on the scope or applicability of the disclosure or teachings. It will be appreciated that other embodiments can be used based on the disclosure and teachings as provided herein.

The terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one, at least one, or the singular as also including the plural, or vice versa, unless it is clear that it is meant otherwise. For example, when a single item is described herein, more than one item may be used in place of a single item. Similarly, where more than one item is described herein, a single item may be substituted for that more than one item.

As used herein, the term "visible light transmittance" or "VLT" refers to the ratio of total light visible to the human eye (i.e., having a wavelength between 380 nm and 780 nanometers) that is transmitted through a composite stack/transparent substrate system and may be measured according to T-H ASTM C method by using a Haze Gard instrument from BYK.

As used herein, the term "haze value" refers to the percentage of light transmitted through a composite film that is deflected more than 2.5° from the direction of the incoming beam and may be measured according to T-H ASTM-C method using a Haze Gard instrument from BYK.

As used herein, the term "reflectance" refers to a measure of visible light that is reflected from a composite film surface when illuminated by a light source and may be measured according to ASTM E-1349 by using a HunterLab instrument.

Embodiments described herein are generally directed to composite films that include a substrate and a first anti-reflective coating. The anti-reflective coating may include a fluorothermoplastic material and an acrylated polydimethylsiloxane. The composite film formed according to embodiments described herein may have particular characteristics, such as, a high VLT and a low haze.

These concepts are better understood in view of the embodiments described below that illustrate and do not limit the scope of the present disclosure.

FIG. 1 includes an illustration of a cross-sectional view of a portion of an example composite film 100 according to embodiments described herein. As shown in FIG. 1, the composite film 100 may include a first transparent substrate 110 and a first anti-reflective coating 120 overlying a first surface 112 of the first transparent substrate 110.

According to certain embodiments, the composite film 100 may have a particular VLT. For example, the composite film 100 may have VLT of at least about 93.0%, such as, at least about 93.5% or at least about 94.0% or at least about 94.5% or even at least about 95.5%. According to yet other embodiments, the composite film 100 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 100 may have a VLT within a range between any of the minimum and maximum values noted above. It will be further appreciated that the composite film 100 may have a VLT of any value between any of the minimum and maximum values noted above.

According to still other embodiments, the composite film 100 may have a particular haze. For example, the composite film 100 may have a haze of at least about 0.5%, such as, at least about 0.6% or at least about 0.7% or even at least about 0.8%. According to still other embodiments, the composite film 100 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 100 may have a haze within a range between any of the minimum and maximum values noted above. It will be further appreciated that the composite film 100 may have a haze of any value between any of the minimum and maximum values noted above.

According to yet other embodiments, the composite film 100 may have a particular reflectance. For example, the composite film 100 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 100 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 100 may have a reflectance within a range between any of the minimum and maximum values noted above. It will be further appreciated that the composite film 100 may have a reflectance of any value between any of the minimum and maximum values noted above.

According to still other embodiments, the first anti-reflective coating 120 may have a particular fluorothermoplastic material concentration. For example, the first anti-reflective coating 120 may have a fluorothermoplastic material concentration of at least about 90.0 wt. % for a total weight of the first anti-reflective coating 120 or at least about 90.5 wt. % or at least about 91.0 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the first anti-reflective coating 120 may have a fluorothermoplastic material concentration of not greater than about 99.5 wt. % for a total weight of the first anti-reflective coating 120 or not greater than about 99.0 wt. % or even not greater than about 98.5 wt. %. It will be appreciated that the first anti-reflective coating 120 may have a fluorothermoplastic material concentration within a range between any of the minimum and maximum values noted above. It will be further appreciated that the first anti-reflective coating 120 may have a fluorothermoplastic material concentration of any value between any of the minimum and maximum values noted above.

According to still other embodiments, the first anti-reflective coating 120 may have a particular acrylated polydimethylsiloxane concentration. For example, the first anti-reflective coating 120 may have an acrylated polydimethylsiloxane concentration of at least about 0.25 wt. % for a total weight of the first anti-reflective coating 120 or at least about 0.30 wt. % or at least about 0.35 wt. % or at least about 0.40 wt. % or at least about 0.45 wt. % or even at least about 0.50 wt. %. According to still other embodiments, the first anti-reflective coating 120 may have an acrylated polydimethylsiloxane concentration of not greater than about 5.00 wt. % for a total weight of the first anti-reflective coating 120 or not greater than about 4.75 wt. % or not greater than about 4.50 wt. % or not greater than about 4.25 wt. % or not greater than about 4.00 wt. % or not greater than about 3.75 wt. % or not greater than about 3.50 wt. % or not greater than about 3.25 wt. % or not greater than about 3.00 wt. % or not greater than about 2.75 wt. % or not greater than about 2.50 wt. % o not greater than about 2.25 wt. % or even not greater than about 2.0 wt. %. It will be appreciated that the first anti-reflective coating 120 may have an acrylated polydimethylsiloxane concentration within a range between any of the minimum and maximum values noted above. It will be further appreciated that the first anti-reflective coating 120 may have an acrylated polydimethylsiloxane concentration of any value between any of the minimum and maximum values noted above.

According to still other embodiments, the fluorothermoplastic material may include a fluoropolymer having a particular refractive index. For example, the fluoropolymer may have a refractive index of not greater than about 1.4 as measured at 550 nm, such as, not greater than about 1.39 or not greater than about 1.38 or not greater than about 1.37 or not greater than about 1.36 or not greater than about 1.35 or not greater than about 1.34 or not greater than about 1.33 or not greater than about 1.32 or not greater than about 1.31 or not greater than about 1.30. According to still other embodiments, the fluoropolymer may have a refractive index of at least about 1.25 as measured at 550 nm, such as, at least about 1.26 or at least about 1.27 or at least about 1.28 or even at least about 1.29. It will be appreciated that the fluoropolymer may have a refractive index within a range between any of the minimum and maximum values noted above. It will be further appreciated that the fluoropolymer may have a refractive index of any value between any of the minimum and maximum values noted above.

According to yet other embodiments, the fluorothermoplastic material may include a fluoropolyether methacrylic derivative. According to still other embodiments, the fluorothermoplastic material may include tetrafluoroethylene, hexafluoropropylene, vinylidene fluoride or any combination thereof.

According to yet other embodiments, the first anti-reflective film 120 may include a photo initiator. According to still other embodiments, the photo initiator may include a cationic photo initiator. According to yet other embodiments, the cationic photo initiator may include sulfonium, (Thiodi-4,1-phenylene Bis[Diphenylbis](OC-6-11)Hexafluoroantimonate(1-)], P-Thiophenoxyphenyldiphenylsulfonium Hexafluoroantimonate (e.g. trade name CPI 6976 from Aceto Corporation), or any combination thereof.

According to still other embodiments, the first anti-reflective coating 120 may have a particular thickness. For example, the first anti-reflective coating 120 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to yet other embodiments, the first anti-reflective coating 120 may have a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the anti-reflective coating 120 may have a thickness within a range between any of the minimum and maximum values noted above. It will be further appreciated that the anti-reflective coating 120 may have a thickness of any value between any of the minimum and maximum values noted above.

According to still other embodiments, the first transparent substrate 110 may have a particular thickness. For example, the first transparent substrate 110 may have a thickness of at least about 5 mil, such as, at least about 6 mil or at least about 7 mil or at least about 8 mil or at least about 9 mil or even at least about 10 mil. According to yet other embodiments, the first transparent substrate 110 may have a thickness of not greater than about 15 mil, such as, not greater than about 14 mil or not greater than about 13 mil or not greater than about 12 mil or not greater than about 11 mil. It will be appreciated that the thickness of the first transparent substrate 110 may be within a range between, and including, any of the minimum and maximum values noted above. It will be further appreciated that the thickness of the first transparent substrate 110 may be any value between, and including, any of the minimum and maximum values noted above.

According to still other embodiments, the first transparent substrate 110 may be multiple transparent films laminated together by an adhesive. For example, the first transparent substrate 110 may be at least 2 films laminated together by an adhesive or at least 3 films laminated together by an adhesive or at least 4 films laminated together by an adhesive or at least 5 films laminated together by an adhesive or at least 6 films laminated together by an adhesive or at least 7 films laminated together by an adhesive or at least 8 films laminated together by an adhesive or at least 9 films laminated together by an adhesive or at least 10 films laminated together by an adhesive or at least 11 films laminated together by an adhesive or at least 12 films laminated together by an adhesive or at least 13 films laminated together by an adhesive or at least 14 or even 15 films laminated together.

According to yet other embodiments, the first transparent substrate 110 may include a polyethylene terephthalate (PET) film. According to still other embodiments, the first transparent substrate 110 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the first transparent substrate 110 may have a particular thickness. For example, the PET film of the first transparent substrate 110 may have a thickness of at least about 5 mil, such as, at least about 6 mil or at least about 7 mil or at least about 8 mil or at least about 9 mil or even at least about 10 mil. According to yet other embodiments, the PET film of the first transparent substrate 110 may have a thickness of not greater than about 15 mil, such as, not greater than about 14 mil or not greater than about 13 mil or not greater than about 12 mil or not greater than about 11 mil. It will be appreciated that the thickness of the PET film of the first transparent substrate 110 may be within a range between, and including, any of the minimum and maximum values noted above. It will be further appreciated that the thickness of the PET film of the first transparent substrate 110 may be any value between, and including, any of the minimum and maximum values noted above.

Figure 2:
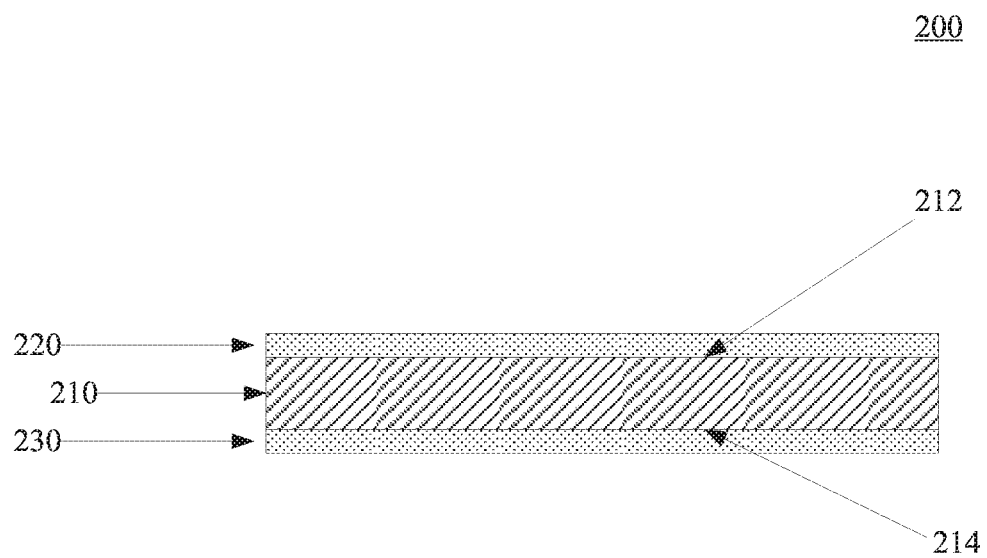
FIG. 2 includes an illustration of another example composite film according to certain embodiments described herein.

FIG. 2 includes an illustration of a cross-sectional view of a portion of another example composite film 200 according to embodiments described herein. As shown in FIG. 2, the composite film 200 may include a first transparent substrate 210, a first anti-reflective coating 220 overlying a first surface 212 of the first transparent substrate 210 and a second anti-reflective coating 230 overlying a second surface 214 of the first transparent substrate 201.

FIG. 2 includes an illustration of a cross-sectional view of a portion of another example composite film 200 according to embodiments described herein. As shown in FIG. 2, the composite film 200 may include a first transparent substrate 210, a first anti-reflective coating 220 overlying a first surface 212 of the first transparent substrate 210 and a second anti-reflective coating 230 overlying a second surface 214 of the first transparent substrate 201.

It will be appreciated that the composite film 200 and all components described in reference to the composite film 200 as shown in FIG. 2 may have any of the characteristics described herein with reference to corresponding components in FIG. 1. In particular, the characteristics of the composite film 200, the transparent substrate 210, and the first anti-reflective coating 220 shown in FIG. 2 may have any of the corresponding characteristics described herein in reference to composite film 100, the transparent substrate 110, and the first anti-reflective coating 120 shown in FIG. 2, respectively.

According to certain embodiments, the composite film 200 may have a particular VLT. For example, the composite film 200 may have VLT of at least about 93.0%, such as, at least about 93.5% or at least about 94.0% or at least about 94.5% or even at least about 95.5%. According to yet other embodiments, the composite film 200 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 200 may have a VLT within a range between any of the minimum and maximum values noted above. It will be further appreciated that the composite film 200 may have a VLT of any value between any of the minimum and maximum values noted above.

According to still other embodiments, the composite film 200 may have a particular haze. For example, the composite film 200 may have a haze of at least about 0.5%, such as, at least about 0.6% or at least about 0.7% or even at least about 0.8%. According to still other embodiments, the composite film 200 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 200 may have a haze within a range between any of the minimum and maximum values noted above. It will be further appreciated that the composite film 200 may have a haze of any value between any of the minimum and maximum values noted above.

According to yet other embodiments, the composite film 200 may have a particular reflectance. For example, the composite film 200 may have a reflectance of at least about 1.5% as measured at 550 nm, such as; at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 200 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 200 may have a reflectance within a range between any of the minimum and maximum values noted above. It will be further appreciated that the composite film 200 may have a reflectance of any value between any of the minimum and maximum values noted above.

According to still other embodiments, the second anti-reflective coating 230 may have a particular fluorothermoplastic material concentration. For example, the second anti-reflective coating 230 may have a fluorothermoplastic material concentration of at least about 90.0 wt. % for a total weight of the second anti-reflective coating 230 or at least about 90.5 wt. % or at least about 91.0 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the second anti-reflective coating 230 may have a fluorothermoplastic material concentration of not greater than about 99.5 wt. % for a total weight of the second anti-reflective coating 230 or not greater than about 99.0 wt. % or even not greater than about 98.5 wt. %. It will be appreciated that the second anti-reflective coating 230 may have a fluorothermoplastic material concentration within a range between any of the minimum and maximum values noted above. It will be further appreciated that the second anti-reflective coating 230 may have a fluorothermoplastic material concentration of any value between any of the minimum and maximum values noted above.

According to still other embodiments, the second anti-reflective coating 230 may have a particular acrylated polydimethylsiloxane concentration. For example, the second anti-reflective coating 230 may have an acrylated polydimethylsiloxane concentration of at least about 0.10 wt. % for a total weight of the second anti-reflective coating 230 or at least about 0.30 wt. % or at least about 0.35 wt. % or at least about 0.40 wt. % or at least about 0.45 wt. % or even at least about 0.50 wt. %. According to still other embodiments, the second anti-reflective coating 230 may have an acrylated polydimethylsiloxane concentration of not greater than about 5.00 wt. % for a total weight of the second anti-reflective coating 230 or not greater than about 4.75 wt. % or not greater than about 4.50 wt. % or not greater than about 4.25 wt. % or not greater than about 4.00 wt. % or not greater than about 3.75 wt. % or not greater than about 3.50 wt. % or not greater than about 3.25 wt. % or not greater than about 3.00 wt. % or not greater than about 2.75 wt. % or not greater than about 2.50 wt. % or not greater than about 2.25 wt. % or even not greater than about 2.0 wt. %. It will be appreciated that the second anti-reflective coating 230 may have an acrylated polydimethylsiloxane concentration within a range between any of the minimum and maximum values noted above. It will be further appreciated that the second anti-reflective coating 230 may have an acrylated polydimethylsiloxane concentration of any value between any of the minimum and maximum values noted above.

According to still other embodiments, the fluorothermoplastic material may include a fluoropolymer having a particular refractive index. For example, the fluoropolymer may have a refractive index of not greater than about 1.4 as measured at 550 nm, such as, not greater than about 1.39 or not greater than about 1.38 or not greater than about 1.37 or not greater than about 1.36 or not greater than about 1.35 or not greater than about 1.34 or not greater than about 1.33 or not greater than about 1.32 or not greater than about 1.31 or not greater than about 1.30. According to still other embodiments, the fluoropolymer may have a refractive index of at least about 1.25 as measured at 550 nm, such as, at least about 1.26 or at least about 1.27 or at least about 1.28 or even at least about 1.29. It will be appreciated that the fluoropolymer may have a refractive index within a range between any of the minimum and maximum values noted above. It will be further appreciated that the fluoropolymer may have a refractive index of any value between any of the minimum and maximum values noted above.

According to yet other embodiments, the fluorothermoplastic material may include a fluoropolyether methacrylic derivative. According to still other embodiments, the fluorothermoplastic material may include tetrafluoroethylene, hexafluoropropylene, vinylidene fluoride or any combination thereof.

According to yet other embodiments, the second anti-reflective coating 230 may include a photo initiator. According to still other embodiments, the photo initiator may include a cationic photo initiator. According to yet other embodiments, the cationic photo initiator may include sulfonium, (Thiodi-4,1-phenylene Bis[Diphenylbis](OC-6-11) Hexafluoroantimonate(1-)], P-Thiophenoxyphenyldiphenylsulfonium Hexafluoroantimonate (e.g. trade name CPI 6976 from Aceto Corporation), or combinations thereof.

According to still other embodiments, the second anti-reflective coating 230 may have a particular thickness. For example, the second anti-reflective coating 230 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to yet other embodiments, the second anti-reflective coating 230 may have a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the second anti-reflective coating 230 may have a thickness within a range between any of the minimum and maximum values noted above. It will be further appreciated that the second anti-reflective coating 230 may have a thickness of any value between any of the minimum and maximum values noted above.

Figure 3:
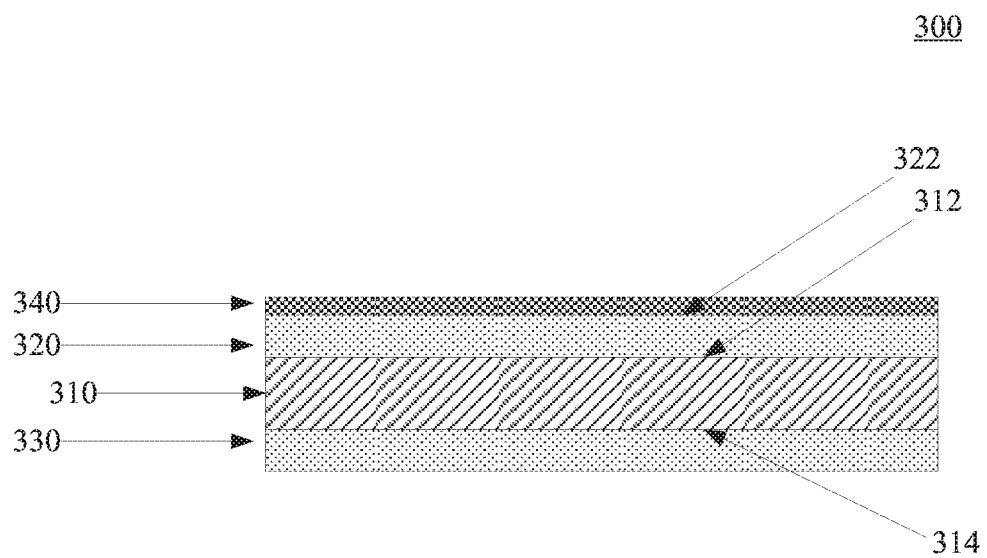
FIG. 3 includes an illustration of another example composite film according to certain embodiments described herein FIG. 4 includes an illustration of another example composite film according to certain embodiments described herein.

FIG. 3 includes an illustration of a cross-sectional view of a portion of another example composite film 300 according to embodiments described herein. As shown in FIG. 3, the composite film 300 may include a first transparent substrate 310, a first anti-reflective coating 320 overlying a first surface 312 of the first transparent substrate 310, a second anti-reflective coating 330 overlying a second surface 314 of the first transparent substrate 310 and a first adhesive layer 340 overlying a surface 322 of the first anti-reflective coating 320.

It will be appreciated that the composite film 300 and all components described in reference to the composite film 300 as shown in FIG. 3 may have any of the characteristics described herein with reference to corresponding components in FIGS. 1 and 2. In particular, the characteristics of the composite film 300, the transparent substrate 310, the first anti-reflective coating 320, and the second anti-reflective coating 330 shown in FIG. 3 may have any of the corresponding characteristics described herein in reference to composite films 200 (100), the transparent substrate 210 (110), the first anti-reflective coating 220 (120) and the second anti-reflective coating 230 shown in FIG. 2 (FIG. 1), respectively.

According to certain embodiments, the composite film 300 may have a particular VLT. For example, the composite film 300 may have VLT of at least about 93.0%, such as, at least about 93.5% or at least about 94.0% or at least about 94.5% or even at least about 95.5%. According to yet other embodiments, the composite film 300 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 300 may have a VLT within a range between any of the minimum and maximum values noted above. It will be further appreciated that the composite film 300 may have a VLT of any value between any of the minimum and maximum values noted above.

According to still other embodiments, the composite film 300 may have a particular haze. For example, the composite film 300 may have a haze of at least about 0.5%, such as, at least about 0.6% or at least about 0.7% or even at least about 0.8%. According to still other embodiments, the composite film 300 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 300 may have a haze within a range between any of the minimum and maximum values noted above. It will be further appreciated that the composite film 300 may have a haze of any value between any of the minimum and maximum values noted above.

According to yet other embodiments, the composite film 300 may have a particular reflectance. For example, the composite film 300 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 300 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 300 may have a reflectance within a range between any of the minimum and maximum values noted above. It will be further appreciated that the composite film 300 may have a reflectance of any value between any of the minimum and maximum values noted above.

According to still other embodiments, the first adhesive layer 340 may include any known pressure sensitive adhesive for use in the adhesive industry, for example, Aroset 1452, Aroset 1450, Aroset 6428 from Ashland, Duro-Tak 222A, Duro-Tak80-1093 or combinations thereof.

According to still other embodiments, the first adhesive layer 340 may have a particular thickness. For example, the first adhesive layer 340 may have a thickness of at least about 2 µm, such as, at least about 5 µm or at least about 7 µm or at least about 10 µm or at least about 12 µm or at least 15 µm or at least about 17 µm or even at least about 20 µm. According to still other embodiments, the first adhesive layer 340 may have a thickness of not greater than about 50 µm, such as, not greater than about 48 µm or not greater than about 45 µm or not greater than about 43 µm or not greater than about 40 µm or not greater than about 38 µm or not greater than about 35 µm or not greater than about 33 µm or even not greater than about 30 µm. It will be appreciated that the first adhesive layer 340 may have a thickness within a range between, and including, any of the minimum and maximum values noted above. It will be further appreciated that the first adhesive layer 340 may have a thickness of any value between, and including, any of the minimum and maximum values noted above.

Figure 4:
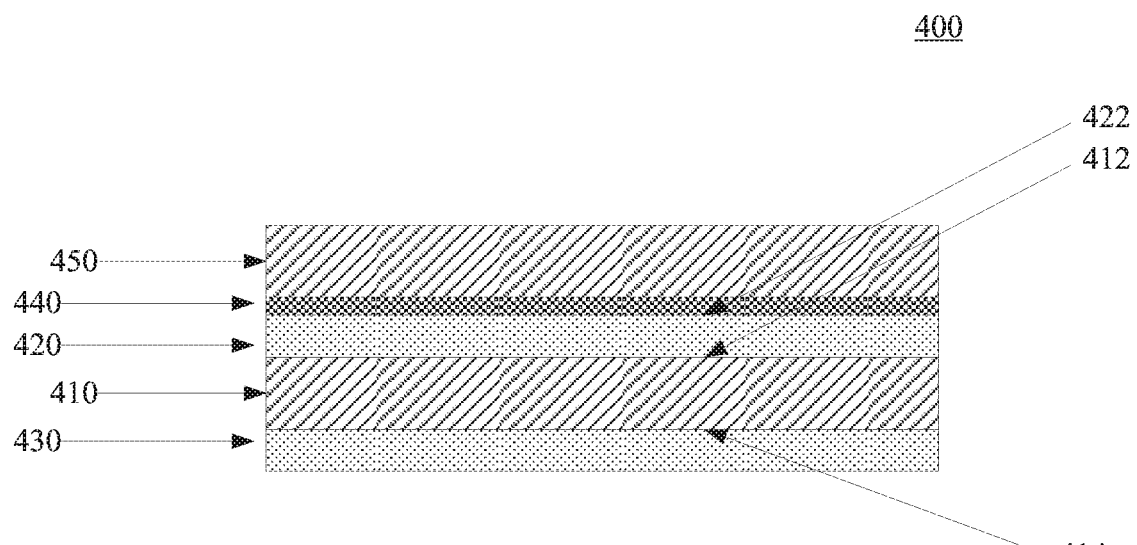

FIG. 4 includes an illustration of a cross-sectional view of a portion of another example composite film 400 according to embodiments described herein. As shown in FIG. 4, the composite film 400 may include a first transparent substrate 410, a first anti-reflective coating 420 overlying a first surface 412 of the first transparent substrate 410, a second anti-reflective coating 430 overlying a second surface 414 of the first transparent substrate 410, a first adhesive layer 440 overlying a surface 422 of the first anti-reflective coating 420 and a second transparent substrate 450 overlying the first adhesive layer 440.

It will be appreciated that the composite film 400 and all components described in reference to the composite film 400 as shown in FIG. 4 may have any of the characteristics described herein with reference to corresponding components in FIGS. 1, 2 and 3. In particular, the characteristics of the composite film 400, the transparent substrate 410, the first anti-reflective coating 420, the second anti-reflective coating 430 and the first adhesive layer 440 shown in FIG. 4 may have any of the corresponding characteristics described herein in reference to composite films 300 (200, 100), the transparent substrate 310 (210, 110), the first anti-reflective coating 320 (220, 120), the second anti-reflective coating 330 (230) and the first adhesive layer 340 shown in FIG. 3 (FIG. 2, FIG. 1), respectively.

According to certain embodiments, the composite film 400 may have a particular VLT. For example, the composite film 400 may have VLT of at least about 93.0%, such as, at least about 93.5% or at least about 94.0% or at least about 94.5% or even at least about 95.5%. According to yet other embodiments, the composite film 400 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 400 may have a VLT within a range between any of the minimum and maximum values noted above. It will be further appreciated that the composite film 400 may have a VLT of any value between any of the minimum and maximum values noted above.

According to still other embodiments, the composite film 400 may have a particular haze. For example, the composite film 400 may have a haze of at least about 0.5%, such as, at least about 0.6% or at least about 0.7% or even at least about 0.8%. According to still other embodiments, the composite film 400 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 400 may have a haze within a range between any of the minimum and maximum values noted above. It will be further appreciated that the composite film 400 may have a haze of any value between any of the minimum and maximum values noted above.

According to yet other embodiments, the composite film 400 may have a particular reflectance. For example, the composite film 400 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 400 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 400 may have a reflectance within a range between any of the minimum and maximum values noted above. It will be further appreciated that the composite film 400 may have a reflectance of any value between any of the minimum and maximum values noted above.

According to still other embodiments, the second transparent substrate 450 may have a particular thickness. For example, the second transparent substrate 450 may have a thickness of at least about 5 mil, such as, at least about 6 mil or at least about 7 mil or at least about 8 mil or at least about 9 mil or even at least about 10 mil. According to yet other embodiments, the second transparent substrate 450 may have a thickness of not greater than about 15 mil, such as, not greater than about 14 mil or not greater than about 13 mil or not greater than about 12 mil or not greater than about 11 mil. It will be appreciated that the thickness of the second transparent substrate 450 may be within a range between, and including, any of the minimum and maximum values noted above. It will be further appreciated that the thickness of the second transparent substrate 450 may be any value between, and including, any of the minimum and maximum values noted above.

According to yet other embodiments, the second transparent substrate 450 may include a PET film. According to still other embodiments, the second transparent substrate 450 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the second transparent substrate 450 may have a particular thickness. For example, the PET film of the second transparent substrate 450 may have a thickness of at least about 5 mil, such as, at least about 6 mil or at least about 7 mil or at least about 8 mil or at least about 9 mil or even at least about 10 mil. According to yet other embodiments, the PET film of the second transparent substrate 450 may have a thickness of not greater than about 15 mil, such as, not greater than about 14 mil or not greater than about 13 mil or not greater than about 12 mil or not greater than about 11 mil. It will be appreciated that the thickness of the PET film of the second transparent substrate 450 may be within a range between, and including, any of the minimum and maximum values noted above. It will be further appreciated that the thickness of the PET film of the second transparent substrate 450 may be any value between, and including, any of the minimum and maximum values noted above.

Figure 5A:
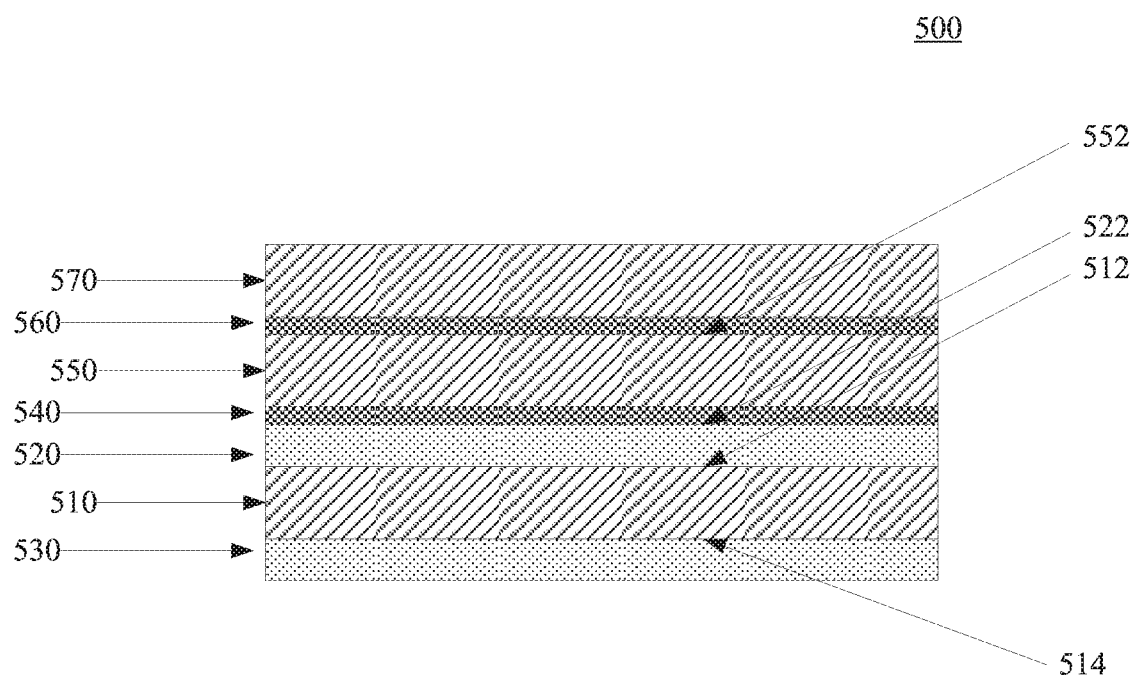
FIG. 5a includes an illustration of another example composite film according to certain embodiments described herein.

FIG. 5a includes an illustration of a cross-sectional view of a portion of another example composite film 500 according to embodiments described herein. As shown in FIG. 5a, the composite film 500 may include a first transparent substrate 510, a first anti-reflective coating 520 overlying a first surface 512 of the first transparent substrate 510, a second anti-reflective coating 530 overlying a second surface 514 of the first transparent substrate 510, a first adhesive layer 540 overlying a surface 522 of the first anti-reflective coating 520, a second transparent substrate 550 overlying the first adhesive layer 540, a second adhesive layer 560 overlying a surface 552 of the second transparent substrate 550, and a third transparent substrate 570 overlying the second adhesive layer 560.

It will be appreciated that the composite film 500 and all components described in reference to the composite film 500 as shown in FIG. 5a may have any of the characteristics described herein with reference to corresponding components in FIGS. 1, 2, 3 and 4. In particular, the characteristics of the composite film 500, the transparent substrate 510, the first anti-reflective coating 520, the second anti-reflective coating 530, the first adhesive layer 540 and the second transparent substrate 550 shown in FIG. 5a may have any of the corresponding characteristics described herein in reference to composite films 400 (300, 200, 100), the transparent substrate 410 (310, 210, 110), the first anti-reflective coating 420 (320, 220, 120), the second anti-reflective coating 430 (330, 230), the first adhesive layer 440 (340) and the second transparent substrate 450 shown in FIG. 4 (FIG. 3, FIG. 2, FIG. 1), respectively.

According to certain embodiments, the composite film 500 may have a particular VLT. For example, the composite film 500 may have VLT of at least about 93.0%, such as, at least about 93.5% or at least about 94.0% or at least about 94.5% or even at least about 95.5%. According to yet other embodiments, the composite film 500 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 500 may have a VLT within a range between any of the minimum and maximum values noted above. It will be further appreciated that the composite film 500 may have a VLT of any value between any of the minimum and maximum values noted above.

According to still other embodiments, the composite film 500 may have a particular haze. For example, the composite film 500 may have a haze of at least about 0.5%, such as, at least about 0.6% or at least about 0.7% or even at least about 0.8%. According to still other embodiments, the composite film 500 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 500 may have a haze within a range between any of the minimum and maximum values noted above. It will be further appreciated that the composite film 500 may have a haze of any value between any of the minimum and maximum values noted above.

According to yet other embodiments, the composite film 500 may have a particular reflectance. For example, the composite film 500 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 500 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 500 may have a reflectance within a range between any of the minimum and maximum values noted above. It will be further appreciated that the composite film 500 may have a reflectance of any value between any of the minimum and maximum values noted above.

According to still other embodiments, the second adhesive layer 560 may include any known pressure sensitive adhesive for use in the adhesive industry, for example, Aroset 1452, Aroset 1450, Aroset 6428 from Ashland, Duro-Tak 222A, Duro-Tak80-1093 or combinations thereof.

According to still other embodiments, the second adhesive layer 560 may have a particular thickness. For example, the second adhesive layer 560 may have a thickness of at least about 2 µm, such as, at least about 5 µm or at least about 7 µm or at least about 10 µm or at least about 12 µm or at least 15 µm or at least about 17 µm or even at least about 20

µm. According to still other embodiments, the second adhesive layer 560 not greater than about 50 µm, such as, not greater than about 48 µm or not greater than about 45 µm or not greater than about 43 µm or not greater than about 40 µm or not greater than about 38 µm or not greater than about 35 µm or not greater than about 33 µm or even not greater than about 30 µm. It will be appreciated that the second adhesive layer 560 may have a thickness within a range between, and including, any of the minimum and maximum values noted above. It will be further appreciated that the second adhesive layer 560 may have a thickness of any value between, and including, any of the minimum and maximum values noted above.

According to still other embodiments, the third transparent substrate 570 may have a particular thickness. For example, the third transparent substrate 570 may have a thickness of at least about 5 mil, such as, at least about 6 mil or at least about 7 mil or at least about 8 mil or at least about 9 mil or even at least about 10 mil. According to yet other embodiments, the third transparent substrate 570 may have a thickness of not greater than about 15 mil, such as, not greater than about 14 mil or not greater than about 13 mil or not greater than about 12 mil or not greater than about 11 mil. It will be appreciated that the thickness of the third transparent substrate 570 may be within a range between, and including, any of the minimum and maximum values noted above. It will be further appreciated that the thickness of the third transparent substrate 570 may be any value between, and including, any of the minimum and maximum values noted above.

According to yet other embodiments, the third transparent substrate 570 may include a PET film. According to still other embodiments, the third transparent substrate 570 may consist of a PET film. According to other embodiments, the transparent substrate 110 may include an optically clear PET film. According to yet other embodiments, the transparent substrate 110 may consist of an optically clear PET film. According to other embodiments, the transparent substrate 110 may include a single layer optically clear PET film. According to yet other embodiments, the transparent substrate 110 may consist of a single layer optically clear PET film.

According to still other embodiments, the PET film of the third transparent substrate 570 may have a particular thickness. For example, the PET film of the third transparent substrate 570 may have a thickness of at least about 5 mil, such as, at least about 6 mil or at least about 7 mil or at least about 8 mil or at least about 9 mil or even at least about 10 mil. According to yet other embodiments, the PET film of the third transparent substrate 570 may have a thickness of not greater than about 15 mil, such as, not greater than about 14 mil or not greater than about 13 mil or not greater than about 12 mil or not greater than about 11 mil. It will be appreciated that the thickness of the PET film of the third transparent substrate 570 may be within a range between, and including, any of the minimum and maximum values noted above. It will be further appreciated that the thickness of the PET film of the third transparent substrate 570 may be any value between, and including, any of the minimum and maximum values noted above.

Figure 5B:
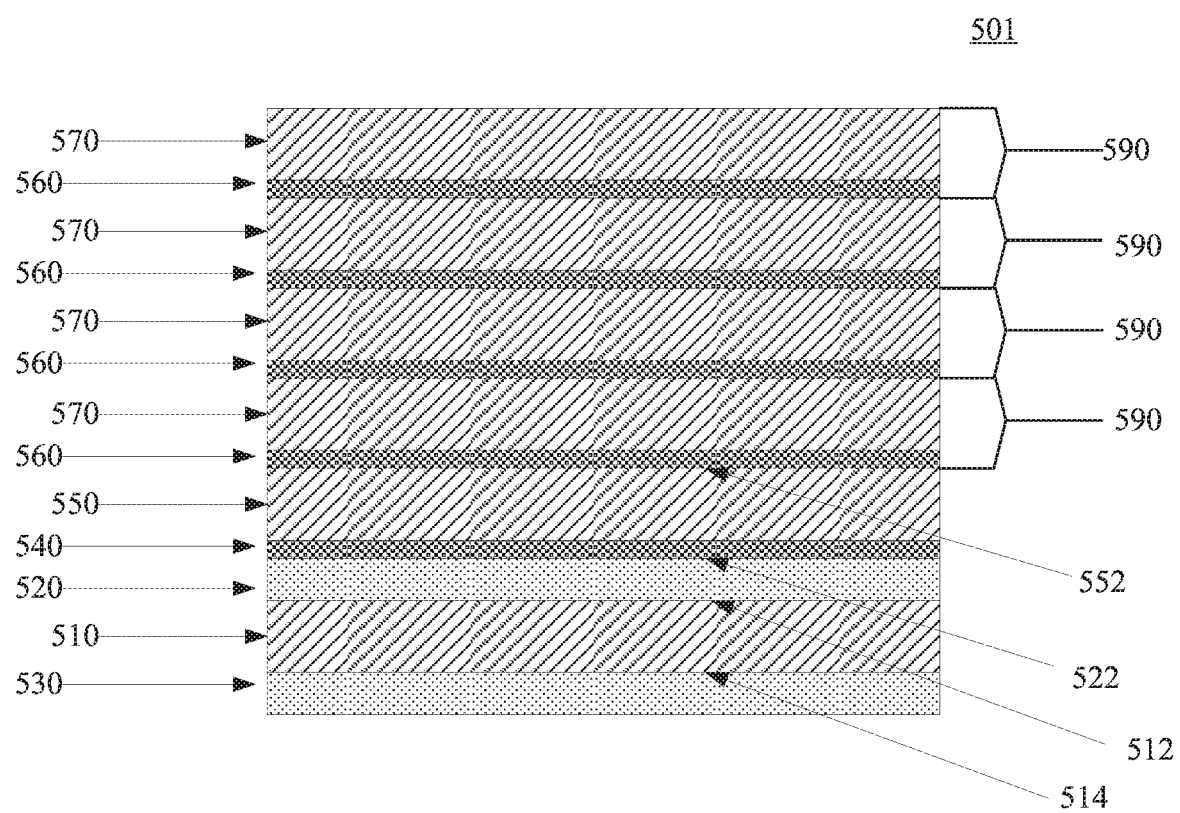
FIG. 5b includes an illustration of another example composite film according to certain embodiments described herein.

FIG. 5b includes an illustration of a cross-sectional view of a portion of another example composite film 501 according to embodiments described herein. As shown in FIG. 5b, the composite film 501 may include a first transparent substrate 510, a first anti-reflective coating 520 overlying a first surface 512 of the first transparent substrate 510, a second anti-reflective coating 530 overlying a second surface 514 of the first transparent substrate 510, a first adhesive layer 540 overlying a surface 522 of the first anti-reflective coating 520, a second transparent substrate 550 overlying the first adhesive layer 540, and four repeating top transparent substrate components 590, which each include a third transparent substrate 570 overlying a second adhesive layer 560.

It will be appreciated that the number of repeating top transparent substrate components 590 shown in FIG. 5b is illustrative and not intended to be limiting. According to particular embodiments, a composite film 501 according to embodiments described herein may include a particular number of repeating top layer components, such as, at least 3 repeating top transparent substrate components 590 or at least 4 repeating top transparent substrate components 590 or at least 5 repeating top transparent substrate components 590 or at least 6 repeating top transparent substrate components 590 or at least 7 repeating top transparent substrate components 590 or at least 8 repeating top transparent substrate components 590 or at least 9 repeating top transparent substrate components 590 or at least 10 repeating top transparent substrate components 590.

According to certain embodiments, the composite film 501 may have a particular VLT. For example, the composite film 501 may have VLT of at least about 93.0%, such as, at least about 93.5% or at least about 94.0% or at least about 94.5% or even at least about 95.5%. According to yet other embodiments, the composite film 501 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 501 may have a VLT within a range between any of the minimum and maximum values noted above. It will be further appreciated that the composite film 501 may have a VLT of any value between any of the minimum and maximum values noted above.

According to still other embodiments, the composite film 501 may have a particular haze. For example, the composite film 501 may have a haze of at least about 0.5%, such as, at least about 0.6% or at least about 0.7% or even at least about 0.8%. According to still other embodiments, the composite film 501 may have a haze of not greater than about 2.0%, such as, not greater than about 1.9% or not greater than about 1.8% or not greater than about 1.7% or not greater than about 1.6% even not greater than about 1.5%. It will be appreciated that the composite film 501 may have a haze within a range between any of the minimum and maximum values noted above. It will be further appreciated that the composite film 501 may have a haze of any value between any of the minimum and maximum values noted above.

According to yet other embodiments, the composite film 501 may have a particular reflectance. For example, the composite film 501 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 501 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 501 may have a reflectance within a range between any of the minimum and maximum values noted above. It will be further appreciated that the composite film 501 may have a reflectance of any value between any of the minimum and maximum values noted above.

Figure 6A:
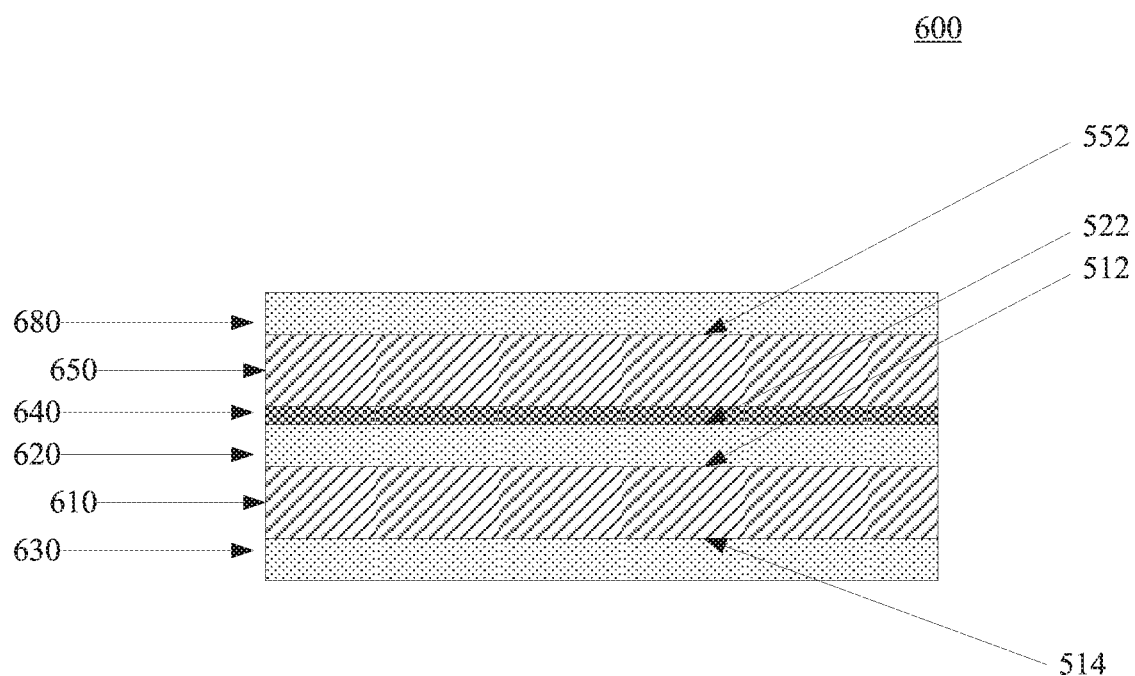
FIG. 6a includes an illustration of another example composite film according to certain embodiments described herein.

FIG. 6a includes an illustration of a cross-sectional view of a portion of another example composite film 600 according to embodiments described herein. As shown in FIG. 6a, the composite film 600 may include a first transparent substrate 610, a first anti-reflective coating 620 overlying a first surface 612 of the first transparent substrate 610, a second anti-reflective coating 630 overlying a second surface 614 of the first transparent substrate 610, a first adhesive layer 640 overlying a surface 622 of the first anti-reflective coating 620, a second transparent substrate 650 overlying the first adhesive layer 640, and a third anti-reflective coating 680 overlying a surface 652 of the second transparent substrate 650.

It will be appreciated that the composite film 600 and all components described in reference to the composite film 600 as shown in FIG. 6a may have any of the characteristics described herein with reference to corresponding components in FIGS. 1, 2, 3, 4, 5a and 5b. In particular, the characteristics of the composite film 600, the transparent substrate 610, the first anti-reflective coating 620, the second anti-reflective coating 630, the first adhesive layer 640 and the second transparent substrate 650 shown in FIG. 6a may have any of the corresponding characteristics described herein in reference to composite films 500 (400, 300, 200, 100), the transparent substrate 510 (410, 310, 210, 110), the first anti-reflective coating 520 (420, 320, 220, 120), the second anti-reflective coating 530 (430, 330, 230), the first adhesive layer 540 (440, 340) and the second transparent substrate 550 (450) shown in FIG. 5a or 5b (FIG. 4, FIG. 3, FIG. 2, FIG. 1), respectively.

According to still other embodiments, the third anti-reflective coating 680 may have a particular fluorothermoplastic material concentration. For example, the third anti-reflective coating 680 may have a fluorothermoplastic material concentration of at least about 90.0 wt. % for a total weight of the third anti-reflective coating 680 or at least about 90.5 wt. % or at least about 91.0 wt. % or at least about 91.5 wt. % or at least about 92.0 wt. % or at least about 92.5 wt. % or at least about 93.0 wt. % or at least about 93.5 wt. % or at least about 94.0 wt. % or at least about 94.5 wt. % or even at least about 95.0 wt. %. According to still other embodiments, the third anti-reflective coating 680 may have a fluorothermoplastic material concentration of not greater than about 99.5 wt. % for a total weight of the third anti-reflective coating 680 or not greater than about 99.0 wt. % or even not greater than about 98.5 wt. %. It will be appreciated that the third anti-reflective coating 680 may have a fluorothermoplastic material concentration within a range between any of the minimum and maximum values noted above. It will be further appreciated that the third anti-reflective coating 680 may have a fluorothermoplastic material concentration of any value between any of the minimum and maximum values noted above.

According to still other embodiments, the third anti-reflective coating 680 may have a particular acrylated polydimethylsiloxane concentration. For example, the third anti-reflective coating 680 may have an acrylated polydimethylsiloxane concentration of at least about 0.10 wt. % for a total weight of the third anti-reflective coating 680 or at least about 0.30 wt. % or at least about 0.35 wt. % or at least about 0.40 wt. % or at least about 0.45 wt. % or even at least about 0.50 wt. %. According to still other embodiments, the third anti-reflective coating 680 may have an acrylated polydimethylsiloxane concentration of not greater than about 5.00 wt. % for a total weight of the third anti-reflective coating 680 or not greater than about 4.75 wt. % or not greater than about 4.50 wt. % or not greater than about 4.25 wt. % or not greater than about 4.00 wt. % or not greater than about 3.75 wt. % or not greater than about 3.50 wt. % or not greater than about 3.25 wt. % or not greater than about 3.00 wt. % or not greater than about 2.75 wt. % or not greater than about 2.50 wt. % o not greater than about 2.25 wt. % or even not greater than about 2.0 wt. %. It will be appreciated that the third anti-reflective coating 680 may have an acrylated polydimethylsiloxane concentration within a range between any of the minimum and maximum values noted above. It will be further appreciated that the third anti-reflective coating 680 may have an acrylated polydimethylsiloxane concentration of any value between any of the minimum and maximum values noted above.

According to still other embodiments, the fluorothermoplastic material may include a fluoropolymer having a particular refractive index. For example, the fluoropolymer may have an refractive index of not greater than about 1.4 as measured at 550 nm, such as, not greater than about 1.39 or not greater than about 1.38 or not greater than about 1.37 or not greater than about 1.36 or not greater than about 1.35 or not greater than about 1.34 or not greater than about 1.33 or not greater than about 1.32 or not greater than about 1.31 or not greater than about 1.30. According to still other embodiments, the fluoropolymer may have a refractive index of at least about 1.25 as measured at 550 nm, such as, at least about 1.26 or at least about 1.27 or at least about 1.28 or even at least about 1.29. It will be appreciated that the fluoropolymer may have a refractive index within a range between any of the minimum and maximum values noted above. It will be further appreciated that the fluoropolymer may have a refractive index of any value between any of the minimum and maximum values noted above.

According to yet other embodiments, the fluorothermoplastic material may include a fluoropolyether methacrylic derivative. According to still other embodiments, the fluorothermoplastic material may include tetrafluoroethylene, hexafluoropropylene, vinylidene fluoride or any combination thereof.

According to yet other embodiments, the third anti-reflective coating 680 may include a photo initiator. According to still other embodiments, the photo initiator may include a cationic photo initiator. According to yet other embodiments, the cationic photo initiator may include sulfonium, (Thiodi-4,1-phenylene Bis[Diphenylbis](OC-6-11) Hexafluoroantimonate(1−)], P-Thiophenoxyphenyldiphenylsulfonium Hexafluoroantimonate (e.g. trade name CPI 6976 from Aceto Corporation), or combinations thereof.

According to still other embodiments, the third anti-reflective coating 680 may have a particular thickness. For example, the third anti-reflective coating 680 may have a thickness of at least about 50 nm, such as, at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or even at least about 200 nm. According to yet other embodiments, the third anti-reflective coating 680 may have a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or even not greater than about 300 nm. It will be appreciated that the third anti-reflective coating 680 may have a thickness within a range between any of the minimum and maximum values noted above. It will be further appreciated that the third anti-reflective coating 680 may have a thickness of any value between any of the minimum and maximum values noted above.

Figure 6B:
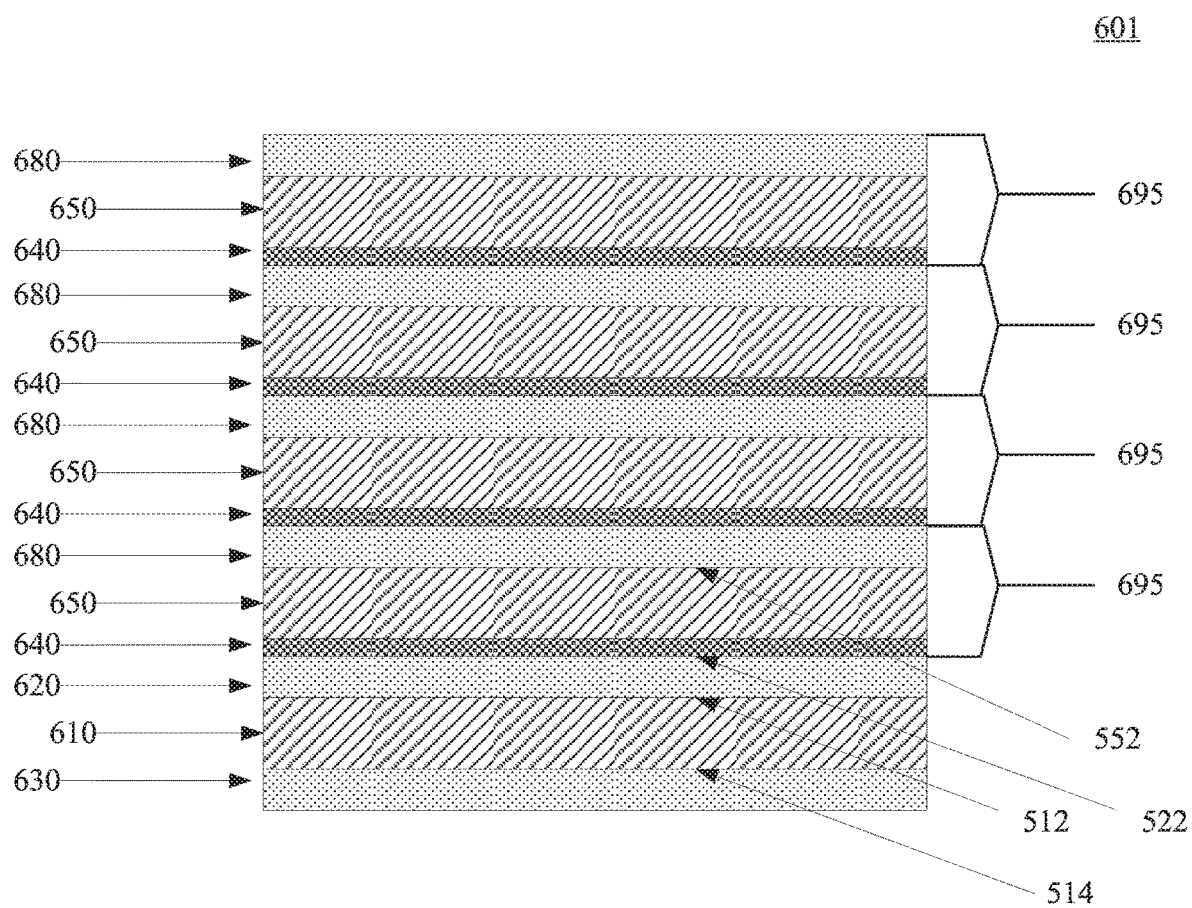
FIG. 6b includes an illustration of another example composite film according to certain embodiments described herein.

FIG. 6*b* includes an illustration of a cross-sectional view of a portion of another example composite film 601 according to embodiments described herein. As shown in FIG. 6*b*, the composite film 601 may include a first transparent substrate 610, a first anti-reflective coating 620 overlying a first surface 612 of the first transparent substrate 610, a second anti-reflective coating 630 overlying a second surface 614 of the first transparent substrate 610, and four repeating top anti-reflective components 695 overlying a surface 622 of the first anti-reflective coating 620. Each repeating top anti-reflective components 695 may include a first adhesive layer 640, a second transparent substrate 650 overlying the first adhesive layer 640 and a third anti-reflective coating 680 overlying the second transparent substrate 650.

It will be appreciated that the number of repeating top anti-reflective components 695 shown in FIG. 6*b* is illustrative and not intended to be limiting. According to particular embodiments, a composite film 601 according to embodiments described herein may include a particular number of repeating top layer components, such as, at least 3 repeating top anti-reflective components 695 or at least 4 repeating top anti-reflective components 695 or at least 5 repeating top anti-reflective components 695 or at least 6 repeating top anti-reflective components 695 or at least 7 repeating top anti-reflective components 695 or at least 8 repeating top anti-reflective components 695 or at least 9 repeating top anti-reflective components 695 or at least 10 repeating top anti-reflective components 695.

According to certain embodiments, the composite film 601 may have a particular VLT. For example, the composite film 601 may have VLT of at least about 93.0%, such as, at least about 93.5% or at least about 94.0% or at least about 94.5% or even at least about 95.5%. According to yet other embodiments, the composite film 601 may have a VLT of not greater than about 99.5% or not greater than about 98.5% or not greater than about 98.0% or not greater than about 97.5% or not greater than about 97.0% or not greater than about 96.5% or even not greater than about 96.0%. It will be appreciated that the composite film 601 may have a VLT within a range between any of the minimum and maximum values noted above. It will be further appreciated that the composite film 601 may have a VLT of any value between any of the minimum and maximum values noted above.

According to still other embodiments, the composite film 601 may have a particular haze. For example, the composite film 601 may have a haze of at least about 0.5%, such as, at least about 0.6% or at least about 0.7% or even at least about 0.8%. According to still other embodiments, the composite film 601 may have a haze of not greater than about 2.0%, such as, not greater than about 1.9% or not greater than about 1.8% or not greater than about 1.7% or not greater than about 1.6% or even not greater than about 1.5%. It will be appreciated that the composite film 601 may have a haze within a range between any of the minimum and maximum values noted above. It will be further appreciated that the composite film 601 may have a haze of any value between any of the minimum and maximum values noted above.

According to yet other embodiments, the composite film 601 may have a particular reflectance. For example, the composite film 601 may have a reflectance of at least about 1.5% as measured at 550 nm, such as, at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or even at least about 3.5%. According to still other embodiments, the composite film 601 may have a reflectance of not greater than about 7.0% as measured at 550 nm, such as, not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or even not greater than about 5.0%. It will be appreciated that the composite film 601 may have a reflectance within a range between any of the minimum and maximum values noted above. It will be further appreciated that the composite film 601 may have a reflectance of any value between any of the minimum and maximum values noted above.

According to embodiments described herein, an anti-reflective coating as described herein may be applied to another layer, for example, a substrate or another coating, using wet coating methods, such as, Meyer rod methods, gravure methods, reverse gravure methods, mini gravure methods, slot die methods, spray coating methods or dip coating methods. According to yet other embodiments described herein, the newly applied coating may be dried in an oven to remove solvents. According to yet other embodiments, the dried coating may then be cured by UV light, electronic beam, and other high energy beam heating.

According to still other embodiments, the pressure sensitive adhesive layers described herein may be applied a substrate or another coating, using wet coating methods, such as, Meyer rod methods, gravure methods, reverse gravure methods, mini gravure methods, slot die methods, spray coating methods or dip coating methods.

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiment 1

A composite film comprising: a substrate; and a first anti-reflective coating overlying a first surface of the substrate, wherein the first anti-reflective coating comprises a fluorothermoplastic material, and an acrylated polydimethylsiloxane; and wherein the composite film has a VLT of at least about 93.0% and not greater than about 99.5%.

Embodiment 2

A composite film comprising: a substrate; and a first anti-reflective coating overlying surface of the substrate, wherein the first anti-reflective coating comprises a fluorothermoplastic material, and an acrylated polydimethylsiloxane; and wherein the composite film has a haze value of at least about 0.5% and not greater than about 1.5%.

Embodiment 3

A composite film comprising: a substrate; and a first anti-reflective coating overlying a surface of the substrate, wherein the first anti-reflective coating comprises: a fluorothermoplastic material at a concentration of at least about 90.00 wt. % and not greater than about 99.50 wt. % for a total weight of the first anti-reflective coating; and an acrylated polydimethylsiloxane at a concentration of at least about 0.10 wt. % and not greater than about 5.00 wt. % for a total weight of the first anti-reflective coating.

Embodiment 4

The composite film of any one of embodiments 1, 2, and 3, wherein the composite film further comprises a VLT of at least about 93.0% or at least about 93.5% or at least about 94.0% or at least about 94.5% or at least about 95.5%.

Embodiment 5

The composite film of any one of embodiments 1, 2, and 3, wherein the composite film further comprises a VLT of not greater than about 99.5% or not greater than about 98.5% or not greater than about 98.0% or not greater than about 97.5% or not greater than about 97.0% or not greater than about 96.5% or not greater than about 96.0%.

Embodiment 6

The composite film of any one of embodiments 1, 2, and 3, wherein the composite film further comprises a haze of at least about 0.5% or at least about 0.6% or at least about 0.7% or at least about 0.8%.

Embodiment 7

The composite film of any one of embodiments 1, 2, and 3, wherein the composite film further comprises a haze of not greater than about 2.0% or not greater than about 1.9% or not greater than about 1.8% or not greater than about 1.7% or not greater than about 1.6% or not greater than about 1.5%.

Embodiment 8

The composite film of any one of embodiments 1, 2, and 3, wherein the composite film further comprises a reflectance of at least about 1.5% as measured at 550 nm or at least about 1.6% or at least about 1.7% or at least about 1.8% or at least about 1.9% or at least about 2.0% or at least about 2.1% or at least about 2.2% or at least about 2.3% or at least about 2.4% or at least about 2.5% or at least about 2.6% or at least about 2.7% or at least about 2.8% or at least about 2.9% or at least about 3.0% or at least about 3.1% or at least about 3.2% or at least about 3.3% or at least about 3.4% or at least about 3.5%.

Embodiment 9

The composite film of any one of embodiments 1, 2, and 3, wherein the composite film further comprises a reflectance of not greater than about 7.0% as measured at 550 nm or not greater than about 6.9% or not greater than about 6.8% or not greater than about 6.7% or not greater than about 6.6% or not greater than about 6.5% or not greater than about 6.4% or not greater than about 6.3% or not greater than about 6.2% or not greater than about 6.1% or not greater than about 6.0% or not greater than about 5.9% or not greater than about 5.8% or not greater than about 5.7% or not greater than about 5.6% or not greater than about 5.5% or not greater than about 5.4% or not greater than about 5.3% or not greater than about 5.2% or not greater than about 5.1% or not greater than about 5.0%.

Embodiment 10

The composite film of any one of embodiments 1, 2, and 3, wherein the composite film comprises a fluorothermoplastic material at a concentration of at least about 90.0 wt. % for a total weight of the first anti-reflective coating or at least about 95.0 wt. %.

Embodiment 11

The composite film of any one of embodiments 1, 2, and 3, wherein the composite film comprises a fluorothermoplastic material at a concentration of not greater than about 99.5 wt. % for a total weight of the first anti-reflective coating or not greater than 98.5 wt. %.

Embodiment 12

The composite film of any one of embodiments 1, 2, and 3, wherein the composite film comprises an acrylated polydimethylsiloxane at a concentration of at least about 0.10 wt. % for a total weight of the first anti-reflective coating or at least about 0.50 wt. %.

Embodiment 13

The composite film of any one of embodiments 1, 2, and 3, wherein the composite film comprises an acrylated polydimethylsiloxane at a concentration of not greater than about 5.00 wt. % for a total weight of the first anti-reflective coating or not greater than 2.00 wt. %.

Embodiment 14

The composite film of any one of the previous embodiments, wherein the fluorothermoplastic material comprises fluoropolymer having a refractive index not greater than about 1.4.

Embodiment 15

The composite film of any one of the previous embodiments, wherein the fluorothermoplastic material comprises a fluoropolyether methacrylic derivative.

Embodiment 16

The composite film of any one of the previous embodiments, wherein the fluorothermoplastic material comprises tetrafluoroethylene, hexafluoropropylene, vinylidene fluoride or any combination thereof.

Embodiment 17

The composite film of any one of the previous embodiments, wherein the photo initiator comprises a cationic photo initiator.

Embodiment 18

The composite film of embodiment 17, wherein the cationic photo initiator comprises sulfonium, (Thiodi-4,1-phenylene Bis[Diphenylbis](OC-6-11)Hexafluoroantimonate (1–)], P-Thiophenoxyphenyldiphenylsulfonium Hexafluoroantimonate (e.g. trade name CPI 6976 from Aceto Corporation), or combinations thereof.

Embodiment 19

The composite film of any one of the previous embodiments, wherein the first anti-reflective coating has a thickness of at least about 50 nm or at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or at least about 200 nm.

Embodiment 20

The composite film of any one of the previous embodiments, wherein the first anti-reflective coating has a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or not greater than about 300 nm.

Embodiment 21

The composite film of any one of the previous embodiments, wherein the composite film further comprises a second anti-reflective coating overlying a second surface of the substrate, wherein the second surface of the substrate is parallel to and opposite of the first surface of the substrate.

Embodiment 22

The composite film of embodiment 21, wherein the second anti-reflective coating comprises a fluorothermoplastic material, and an acrylated polydimethylsiloxane.

Embodiment 23

The composite film of embodiment 22, wherein the composite film comprises a fluorothermoplastic material at a concentration of at least about 90.0 wt. % for a total weight of the second anti-reflective coating or at least about 95.0 wt. %.

Embodiment 24

The composite film of embodiment 22, wherein the composite film comprises a fluorothermoplastic material at a concentration of not greater than about 99.5 wt. % for a total weight of the second anti-reflective coating or not greater than 98.0 wt. %.

Embodiment 25

The composite film of embodiment 22, wherein the composite film comprises an acrylated polydimethylsiloxane at a concentration of at least about 0.10 wt. % for a total weight of the second anti-reflective coating or at least about 0.50 wt. %.

Embodiment 26

The composite film of embodiment 22, wherein the composite film comprises an acrylated polydimethylsiloxane at a concentration of not greater than about 5.00 wt. % for a total weight of the second anti-reflective coating or not greater than 2.50 wt. %.

Embodiment 27

The composite film of embodiment 22, wherein the fluorothermoplastic material comprises fluoropolymer having a refractive index not greater than about 1.4.

Embodiment 28

The composite film of embodiment 22, wherein the fluorothermoplastic material comprises a fluoropolyether methacrylic derivative.

Embodiment 29

The composite film of embodiment 22, wherein the fluorothermoplastic material comprises tetrafluoroethylene, hexafluoropropylene, vinylidene fluoride or any combination thereof.

Embodiment 30

The composite film of embodiment 22, wherein the photo initiator comprises a cationic photo initiator.

Embodiment 31

The composite film of embodiment 22, wherein the cationic photo initiator comprises sulfonium, (Thiodi-4,1-phenylene Bis[Diphenylbis](OC-6-11)Hexafluoroantimonate (1−)], P-Thiophenoxyphenyldiphenylsulfonium Hexafluoroantimonate (e.g. trade name CPI 6976 from Aceto Corporation), or combinations thereof.

Embodiment 32

The composite film of embodiment 22, wherein the second anti-reflective coating has a thickness of at least about 50 nm or at least about 60 nm or at least about 70 nm or at least about 80 nm or at least about 90 nm or at least about 100 nm or at least about 110 nm or at least about 120 nm or at least about 130 nm or at least about 140 nm or at least about 150 nm or at least about 160 nm or at least about 170 nm or at least about 180 nm or at least about 190 nm or at least about 200.

Embodiment 33

The composite film of embodiment 22, wherein the second anti-reflective coating has a thickness of not greater than about 500 nm or not greater than about 490 nm or not greater than about 480 nm or not greater than about 470 nm or not greater than about 460 nm or not greater than about 450 nm or not greater than about 440 nm or not greater than about 430 nm or not greater than about 420 nm or not greater than about 410 nm or not greater than about 400 nm or not greater than about 390 nm or not greater than about 380 nm or not greater than about 370 nm or not greater than about 360 nm or not greater than about 350 nm or not greater than about 340 nm or not greater than about 330 nm or not greater than about 320 nm or not greater than about 310 nm or not greater than about 300 nm.

Embodiment 34

The composite film of any one of the previous embodiments, wherein the substrate comprises a PET film.

Embodiment 35

The composite film of any one of the previous embodiments, wherein the substrate comprises an optically clear PET film.

Embodiment 36

The composite film of any one of the previous embodiments, wherein the substrate comprises a single layer optically clear PET film.

Embodiment 37

The composite film of any one of the embodiments 34, 35, and 36, wherein PET film comprises a thickness of at least about 5 mil or at least about 6 mil or at least about 7 mil or at least about 8 mil or at least about 9 mil or at least about 10 mil.

Embodiment 38

The composite film of any one of the embodiments 34, 35, and 36, wherein PET film comprises a thickness of not greater than about 15 mil or not greater than about 14 mil or not greater than about 13 mil or not greater than about 12 mil or not greater than about 11 mil.

Embodiment 39

The composite film of any one of the previous embodiments, wherein the substrate comprises at least a first PET film and a second PET film.

Embodiment 40

The composite film of embodiment 39, wherein the substrate comprises a first laminating adhesive between the first PET film and the second PET film.

Embodiment 41

The composite film of embodiment 40, wherein the first laminating adhesive comprises a pressure sensitive adhesive (PSA) or a polyester adhesive cured with a polyisocyanate curing agent.

Embodiment 42

The composite film of embodiment 41, wherein the pressure sensitive adhesive comprises an acrylic pressure sensitive adhesive.

Embodiment 43

The composite film of embodiment 39, wherein the first PET film comprises an optically clear PET film.

Embodiment 44

The composite film of embodiment 39, wherein the second PET film comprises an optically clear PET film.

Embodiment 45

The composite film of any one of the embodiments 39, 40, 43, and 44, wherein the first PET film comprises a thickness of at least about 5 mil or at least about 6 mil or at least about 7 mil or at least about 8 mil or at least about 9 mil or at least about 10 mil.

Embodiment 46

The composite film of any one of the embodiments 39, 40, 43, and 44, wherein second PET film comprises a thickness of not greater than about 15 mil or not greater than about 14 mil or not greater than about 13 mil or not greater than about 12 mil or not greater than about 11 mil.

Embodiment 47

The composite film of any one of the previous embodiments, wherein the substrate comprises a thickness of at least about 1 mil or at least about 2 mil or at least about 3 mil or at least about 4 mil or at least about 5 mil or at least about 6 mil or at least about 7 mil or at least about 8 mil or at least about 9 mil or at least about 10 mil.

Embodiment 48

The composite film of any one of the previous embodiments, wherein the substrate comprises a thickness of not greater than about 20 mil or not greater than about 19 mil or not greater than about 18 mil or not greater than about 17 mil or not greater than about 16 mil or not greater than about 15

Embodiment 49

The composite film of any one of the previous embodiments, wherein the composite film further comprises a protective liner overlying the first anti-reflective coating; and wherein the first anti-reflective coating is between the substrate and the protective liner.

Embodiment 50

The composite film of embodiment 49, wherein the protective liner is a colored liner.

Embodiment 51

The composite film of embodiment 49, wherein the protective liner comprises a low tack adhesive.

Embodiment 52

The composite film of any one of the previous embodiments, wherein the composite film is configured to overly a medical hood.

Embodiment 53

The composite film of any one of the previous embodiments, wherein the composite film is configured to overly an optical lens, wherein the optical lens is a portion of a pair of googles.

Embodiment 54

The composite film of any one of the previous embodiments, wherein the composite film is configured to overly a face shield, wherein the face shield is associated with racing optics.

Embodiment 55

A method of forming a composite film, wherein the method comprises: providing a first anti-reflective coating formulation comprising an active coating mixture comprising a fluorothermoplastic material, and an acrylated polydimethylsiloxane, and a photo initiator; applying the anti-reflective coating formulation to a substrate; and drying the anti-reflective coating formulation to form a first anti-reflective coating overlying the substrate.

Embodiment 56

The method of embodiment 55, wherein providing the first anti-reflective coating formulation further comprises dissolving the active coating mixture in an organic solvent mixture.

Embodiment 57

The method of embodiment 56, wherein the organic solvent mixture comprises methyl ethyl ketone (MEK), methyl isobutyl ketone (MIBK) or a combination thereof.

Embodiment 58

The method of embodiment 57, wherein the organic solvent mixture further comprises propylene glycol monomethyl ether acetate (PGMEA).

Embodiment 59

The method of embodiment 58, wherein the organic solvent mixture further comprises a wetting agent, a flow agent, a de-foaming agent or combinations thereof.

Embodiment 60

The method of embodiment 56, wherein the anti-reflective coating formulation comprises the active coating mixture at a concentration of at least about 1 vol. % for a total volume of the anti-reflective coating formulation or at least about 1.3 vol. % or at least about 1.5 vol. % or at least about 1.8 vol. % or at least about 2.0 vol. % or at least about 2.3 vol. % or at least about 2.5 vol. % or at least about 2.8 vol. % or at least about 3.0 vol. % or at least about 3.3 vol. % or at least about 3.5 vol. % or at least about 3.8 vol. % or at least about 4.0 vol. % or at least about 4.3 vol. % or at least about 4.5 vol. %.

Embodiment 61

The method of embodiment 60, wherein the anti-reflective coating formulation comprises the active coating mixture at a concentration of not greater than about 10 vol. % for a total volume of the anti-reflective coating formulation or not greater than about 9.8 vol. % or not greater than about 9.5 vol. % or not greater than about 9.3 vol. % or not greater than about 9.0 vol. % or not greater than about 8.8 vol. % or not greater than about 8.5 vol. % or not greater than about 8.3 vol. % or not greater than about 8.0 vol. % or not greater than about 7.8 vol. % or not greater than about 7.5 vol. % or not greater than about 7.3 vol. % or not greater than about 7.0 vol. % or not greater than about 6.8 vol. % or not greater than about 6.5 vol. % or not greater than about 6.3 vol. % or not greater than about 6.0 vol. % or not greater than about 5.8 vol. % or not greater than about 5.5 vol. %.

Embodiment 62

The method of embodiment 56, wherein the anti-reflective coating formulation comprises the organic solvent mixture at a concentration of at least about 90.0 vol. % for a total volume of the anti-reflective coating formulation or at least about 90.5 vol. % or at least about 91.0 vol. % or at least about 91.5 vol. % or at least about 92.0 vol. % or at least about 92.5 vol. % or at least about 93.0 vol. % or at least about 93.5 vol. % or at least about 94.0 vol. % or at least about 94.5 vol. %.

Embodiment 63

The method of embodiment 60, wherein the anti-reflective coating formulation comprises the organic solvent mixture at a concentration of not greater than about 99.0 vol. % for a total volume of the anti-reflective coating formulation or not greater than about 98.5 vol. % or not greater than about 98.0 vol. % or not greater than about 97.5 vol. % or not greater than about 96.0 vol. % or not greater than about 95.5 vol. %.

mil or not greater than about 14 mil or not greater than about 13 mil or not greater than about 12 mil or not greater than about 11 mil.

Embodiment 64

The method of embodiment 56, wherein the anti-reflective coating formulation comprises the fluorothermoplastic material at a concentration of at least about 1.0 vol. % for a total volume of the anti-reflective coating formulation.

Embodiment 65

The method of embodiment 56, wherein the anti-reflective coating formulation comprises the fluorothermoplastic material at a concentration of not greater than about 9.0 vol. % for a total volume of the anti-reflective coating formulation.

Embodiment 66

The method of embodiment 56, wherein the anti-reflective coating formulation comprises the acrylated polydimethylsiloxane at a concentration of at least about 0.01 vol. % for a total volume of the anti-reflective coating formulation.

Embodiment 67

The method of embodiment 56, wherein the anti-reflective coating formulation comprises the acrylated polydimethylsiloxane at a concentration of not greater than about 0.1 vol. % for a total volume of the anti-reflective coating formulation.

Embodiment 68

The method of embodiment 56, wherein the anti-reflective coating formulation comprises the photo initiator at a concentration of at least about 0.01 vol. % for a total volume of the anti-reflective coating formulation.

Embodiment 69

The method of embodiment 56, wherein the anti-reflective coating formulation comprises the photo initiator at a concentration of not greater than about 0.1 vol. % for a total volume of the anti-reflective coating formulation.

Embodiment 70

The method of embodiment 55, wherein applying the anti-reflective coating formulation to form the first anti-reflective coating comprises applying the coating using a Meyer rod, a gravure, dip coating, slot die and other coating methods

Embodiment 71

The method of embodiment 55, wherein drying the anti-reflective coating formulation comprises drying the coating in an oven and then curing the coating using a UV light, e-beam or other high energy rays.

EXAMPLES

The concepts described herein will be further described in the following Examples, which do not limit the scope of the invention described in the claims.

Example 1

Two sample composite films S1 and S2 were formed according to embodiments described herein and three comparative sample composite films CS1, CS2 and CS3 were formed for comparison to the sample composite films S1 and S2.

The first sample composite film S1 was formed according to embodiments described herein by preparing an anti-reflective coating solution that included: 1) 28.00 parts by weight of methyl isobutyl ketone (MIBK), 2) 45.57 parts by weight of methyl ethyl ketone (MEK), 3) 26.00 parts by weight of a 7.68% THV solution as described below, 4) 0.20 parts by weight of a 10% Tegorad 2500 solution as described below, 5) 0.20 parts by weight of 10% CPI 6976 solution as described below and 6) 0.03 parts by weight of Tego Glide 410 (polyether modified polysiloxane, a slip and anti-blocking additive from Evonik Industries). The 7.68% THV solution used in the anti-reflective coating included: 1) 7.68 parts by weight of a fluorothermoplastic containing tetrafluoroethylene, hexafluoropropylene, and vinylidene fluoride (THV 221AZ from 3M Company), 57.15 parts by weight of methyl ethyl ketone (MEK) and 36.17 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.12% solid and was coated with #5 Meyer rod onto one side of a 7.5 mil V7610 PET film (from SKC films, South Korea), dried in oven at 110° C. for 30 seconds, then cured with UV light to form a first anti-reflective coating.

The second sample composite film S2 was formed according to embodiments described herein by preparing an anti-reflective coating solution that included: 1) 28.00 parts by weight of methyl isobutyl ketone (MIBK), 2) 45.6 parts by weight of methyl ethyl ketone (MEK), 3) 26.00 parts by weight of a 7.68% THV solution, 4) 0.20 parts by weight of a 10% Tegorad 2500 solution, and 5) 0.20 parts by weight of 10% CPI 6976 solution. The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.07% solid and was coated with #5 Meyer rod onto one side of a 7.5 mil V7610 PET film (from SKC films, South Korea), dried in oven at 110° C. for 30 seconds, then cured with UV light to form a first anti-reflective coating.

The first comparative sample composite film CS1 was formed by preparing a coating solution that included: 1) 28.00 parts by weight of methyl isobutyl ketone (MIBK), 2) 46.0 parts by weight of methyl ethyl ketone (MEK), and 3) 26.00 parts by weight of a 7.68% THV solution. The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The anti-reflective coating solution had approximately 2.02% solid and was coated with #5 Meyer rod onto one side of a 7.5 mil V7610 PET film (from SKC films, South Korea), dried in oven at 110° C. for 30 seconds, then cured with UV light to form a first anti-reflective coating.

The second comparative sample composite film CS2 was formed by preparing a coating solution that included: 1) 28.00 parts by weight of methyl isobutyl ketone (MIBK), 2) 45.94 parts by weight of methyl ethyl ketone (MEK), 3) 26.00 parts by weight of a 7.68% THV solution and 4) 0.06 parts by weight of Byk 3550 (polysiloxane modified polyacrylate from BYK USA). The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The anti-reflective coating solution had approximately 2.03% solid and was coated with #5 Meyer rod onto one side of a 7.5 mil V7610 PET film (from SKC films, South Korea), dried in oven at 110° C. for 30 seconds, then cured with UV light to form a first anti-reflective coating.

The third comparative sample composite film CS3 was formed by preparing a coating solution that included: 1) 28.00 parts by weight of methyl isobutyl ketone (MIBK), 2) 45.97 parts by weight of methyl ethyl ketone (MEK), 3) 26.00 parts by weight of a 7.68% THV solution and 4) 0.03 parts by weight of Tego Glide 410 (slip and anti-blocking additive from Evonik Industries). The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The anti-reflective coating solution had approximately 2.03% solid and was coated with #5 Meyer rod onto one side of a 7.5 mil V7610 PET film (from SKC films, South Korea), dried in oven at 110° C. for 30 seconds, then cured with UV light to form a first anti-reflective coating.

Each of the anti-reflective coatings of the sample composite films S1 and S2 and the comparative sample composite films CS1, CS2 and CS3 were tested for coating adhesion by applying 3M Scotch tape onto the anti-reflective coating side and then peeling if off. The adhesion of the anti-reflective coating was ranked and summarized in the Table 1 below (adhesion ranking: 5=best, no coating coming off, and 1=worst, a lot coating coming off from PET substrate).

TABLE 1

| Anti-reflective Coating Adhesion | | |
| --- | --- | --- |
| Composite Films | THV/Tegorad 2500 | Adhesion |
| S1 | 96.61%/0.97% | 4 |
| S2 | 98.04%/0.98% | 5 |
| CS1 | 100.00%/0% | 3 |
| CS2 | 100.00%/0% | 2 |
| CS3 | 100.00%/0% | 1 |

Example 2

Eight sample composite films S3-S10 were formed according to embodiments described herein.

The sample composite film S3 was formed according to embodiments described herein by preparing an anti-reflective coating solution that included: 1) 28.00 parts by weight of methyl isobutyl ketone (MIBK), 2) 45.6 parts by weight of methyl ethyl ketone (MEK), 3) 26.00 parts by weight of a 7.68% THV solution, 4) 0.20 parts by weight of a 10% Tegorad 2500 solution, and 5) 0.20 parts by weight of 10% CPI 6976 solution. The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.07% solid and was coated with #5 Meyer rod onto one side of a 7.5 mil V7610 PET film (from SKC films, South Korea), dried in oven at 110° C. for 30 seconds, then cured with UV light to form a first anti-reflective coating. The same anti-reflective coating solution was then coated and cured in the same manner onto the opposite side of the 7.5 mil V7610 PET film to form a second anti-reflective coating.

The sample composite film S4 was formed according to embodiments described herein by preparing an anti-reflective coating solution that included: 1) 28.00 parts by weight of methyl isobutyl ketone (MIBK), 2) 45.57 parts by weight of methyl ethyl ketone (MEK), 3) 26.00 parts by weight of a 7.68% THV solution, 4) 0.20 parts by weight of a 10% Tegorad 2500 solution, 5) 0.20 parts by weight of 10% CPI 6976 solution and 6) 0.03 parts by weight of Tego Glide 410 (polyether modified polysiloxane, a slip and anti-blocking additive from Evonik Industries). The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.12% solid and was coated with #5 Meyer rod onto one side of a 7.5 mil V7610 PET film (from SKC films, South Korea), dried in oven at 110° C. for 30 seconds, then cured with UV light to form a first anti-reflective coating. The same anti-reflective coating solution was then coated and cured in the same manner onto the opposite side of the 7.5 mil V7610 PET film to form a second anti-reflective coating.

The sample composite film S5 was formed according to embodiments described herein by preparing an anti-reflective coating solution that included: 1) 28.00 parts by weight of methyl isobutyl ketone (MIBK), 2) 45.6 parts by weight of methyl ethyl ketone (MEK), 3) 26.00 parts by weight of a 7.68% THV solution, 4) 0.20 parts by weight of a 10% Tegorad 2500 solution, and 5) 0.20 parts by weight of 10% CPI 6976 solution. The 7.68% THV solution used in the anti-reflective coating included: 1) 7.68 parts by weight of a fluorothermoplastic containing tetrafluoroethylene, hexafluoropropylene, and vinylidene fluoride (THV 221AZ), 57.15 parts by weight of methyl ethyl ketone (MEK) and 36.17 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.07% solid. A composite PET was made by coating a polyester based laminating adhesive onto 2 mil SH37 PET (SKC films, South Korea) and then laminating it to a 7 mil SH38 PET film form a 9 mil composite PET film. The anti-reflective coating solution was coated with #5 Meyer rod onto one side of a 9 mil composite PET film, dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite film S6 was formed according to embodiments described herein by preparing an anti-reflective coating solution that included: 1) 25.10 parts by weight of methyl isobutyl ketone (MIBK), 2) 32.50 parts by weight of methyl ethyl ketone (MEK), 3) 2.00 parts by weight of propylene glycol monomethyl ether acetate (PGMEA), 4) 40.00 parts by weight of a 5.0% THV solution, 5) 0.20 parts by weight of a 10% Tegorad 2500 solution, and 6) 0.20 parts by weight of 10% CPI 6976 solution. The 5.0% THV solution used in the anti-reflective coating included: 1) 5.00 parts by weight of THV 221AZ, 55.00 parts by weight of methyl ethyl ketone (MEK) and 40.00 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.05% solid. The anti-reflective coating solution was coated with #5 Meyer rod onto one side of the 9 mil composite PET film, dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite film S7 was formed according to embodiments described herein by preparing an anti-reflective coating solution that included: 1) 17.40 parts by weight of methyl isobutyl ketone (MIBK), 2) 22.20 parts by weight of methyl ethyl ketone (MEK), 3) 20.00 parts by weight of propylene glycol monomethyl ether acetate (PGMEA), 4) 40.00 parts by weight of a 5.0% THV solution, 5) 0.20 parts by weight of a 10% Tegorad 2500 solution, and 6) 0.20 parts by weight of 10% CPI 6976 solution. The 5.0% THV solution used in the anti-reflective coating included: 1) 5.00 parts by weight of THV 221AZ, 55.00 parts by weight of methyl ethyl ketone (MEK) and 40.00 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.05% solid. The anti-reflective coating solution was coated with #5 Meyer rod onto one side of the 9 mil composite PET film, dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite film S8 was formed according to embodiments described herein by preparing an anti-reflective coating solution that included: 1) 17.40 parts by weight of methyl isobutyl ketone (MIBK), 2) 22.20 parts by weight of methyl ethyl ketone (MEK), 3) 20.00 parts by weight of propylene glycol monomethyl ether acetate (PGMEA), 4) 40.00 parts by weight of a 5.0% THV solution, 5) 0.20 parts by weight of a 10% Tegorad 2500 solution, and 6) 0.20 parts by weight of 10% CPI 6976 solution. The 5.0% THV solution used in the anti-reflective coating included: 1) 5.00 parts by weight of THV 221AZ, 55.00 parts by weight of methyl ethyl ketone (MEK) and 40.00 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution was coated with #9 Meyer rod onto one side of a 7 mil SH38 PET film (from SKC films, South Korea), dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite film S9 was formed according to embodiments described herein by preparing an anti-reflective coating solution that included: 1) 17.40 parts by weight of methyl isobutyl ketone (MIBK), 2) 22.20 parts by weight of methyl ethyl ketone (MEK), 3) 20.00 parts by weight of propylene glycol monomethyl ether acetate (PGMEA), 4) 40.00 parts by weight of a 5.0% THV solution, 5) 0.20 parts by weight of a 10% Tegorad 2500 solution, and 6) 0.20 parts by weight of 10% CPI 6976 solution. The 5.0% THV solution used in the anti-reflective coating included: 1) 5.00 parts by weight of THV 221AZ, 55.00 parts by weight of methyl ethyl ketone (MEK) and 40.00 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.05% solid. The anti-reflective coating solution was coated with #3 Meyer rod onto one side of a 7 mil SH38 PET film (from SKC films, South Korea), dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite film S10 was formed according to embodiments described herein by preparing an anti-reflective coating solution that included: 1) 17.52 parts by weight of methyl isobutyl ketone (MIBK), 2) 22.20 parts by weight of methyl ethyl ketone (MEK), 3) 20.00 parts by weight of propylene glycol monomethyl ether acetate (PGMEA), 4) 40.00 parts by weight of a 5.0% THV solution, 5) 0.20 parts by weight of a 10% Tegorad 2500 solution, and 6) 0.08 parts by weight of 10% CPI 6976 solution. The 5.0% THV solution used in the anti-reflective coating included: 1) 5.00 parts by weight of THV 221AZ, 55.00 parts by weight of methyl ethyl ketone (MEK) and 40.00 parts by weight of methyl isobutyl ketone (MIBK). The 10% Tegorad 2500 solution used in the anti-reflective coating included: 1) 10.00 parts by weight of Tegorad 2500 (acrylated polydimethylsiloxane from Evonik Industries) and 90.00 parts by weight of MEK. The 10% CPI 6976 solution included 1) 10.00 parts by weight of CPI 6976 (a cationic photo initiator from Aceto Corporation) and 90.00 parts by weight of MEK. The anti-reflective coating solution had approximately 2.03% solid. The anti-reflective coating solution was coated with #5 Meyer rod onto one side of a 7 mil SH38 PET film (from SKC films, South Korea), dried in oven at 110° C. for 30 seconds, then cured with UV light to form a first anti-reflective coating; the same anti-reflective coating solution was then coated and cured the same as above onto the opposite to the first anti-reflective coating to form a second anti-reflective coating.

The sample composite films S3-S10 with the anti-reflective coatings on both sides were measured for VLT and haze on a BYK Gardner. The anti-reflective coating on the composite PET films were tested for coating adhesion by applying 3M Scotch tape onto the anti-reflective coating side and then peeling if off. The adhesion and optical properties of the anti-reflective coating were summarized in the Table 2 below.

TABLE 2

Anti-reflective Coating Optical Properties

| Composite Film | THV/Tegorad 2500 | Adhesion | VLT | Haze | Reflectance at 550 nm | PET Film | Rod |
|---|---|---|---|---|---|---|---|
| S3 | 98.04%/0.98% | 5 | 98.9 | 1.34 | 1.8 | 7 mil SH38 PET | 5 |
| S4 | 96.61%/0.97% | 5 | 99.0 | 1.11 | 2.0 | 7 mil SH38 PET | 5 |
| S5 | 98.04%/0.98% | 5 | 98.4 | 0.9 | 2.4 | 9 mil Composite PET | 5 |
| S6 | 98.04%/0.98% | 5 | 98.7 | 0.82 | 1.7 | 9 mil Composite PET | 5 |
| S7 | 98.04%/0.98% | 5 | 98.6 | 0.95 | 1.2 | 9 mil Composite PET | 5 |
| S8 | 98.04%/0.98% | 5 | 95.3 | 0.89 | 6.0 | 7 mil SH38 PET | 9 |
| S9 | 98.04%/0.98% | 5 | 97.8 | 1.09 | 3.2 | 7 mil SH38 PET | 3 |
| S10 | 98.62%/0.99% | 5 | 98.9 | 0.84 | 1.7 | 7 mil SH38 PET | 5 |

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A composite film comprising:
    a substrate; and
    a first anti-reflective coating overlying a first surface of the substrate,
        wherein the first anti-reflective coating consists of a fluorothermoplastic material, and an acrylated polydimethylsiloxane;
        wherein the composite film has a visible light transmittance of at least about 93.0% and not greater than about 99.5%,
        wherein the composite film comprises a fluorothermoplastic material at a concentration of at least about 95.0 wt. % and not greater than about 99.5 wt. % for a total weight of the first anti-reflective coating,
        wherein the fluorothermoplastic material comprises fluoropolymer having a refractive index not greater than about 1.4,
        wherein the composite film comprises an acrylated polydimethylsiloxane at a concentration of at least about 0.50 wt. % for a total weight of the first anti-reflective coating, and
        wherein the first anti-reflective coating has a thickness of at least about 120 nm.

2. The composite film of claim 1, wherein the composite film further comprises a haze of at least about 0.5%.

3. The composite film of claim 1, wherein the composite film further comprises a haze of not greater than about 2.0%.

4. The composite film of claim 1, wherein the composite film further comprises a reflectance of at least about 1.5% as measured at 550 nm.

5. The composite film of claim 1, wherein the composite film further comprises a reflectance of not greater than about 7.0% as measured at 550 nm.

6. The composite film of claim 1, wherein the fluorothermoplastic material comprises a fluoropolyether methacrylic derivative.

7. The composite film of claim 1, wherein the fluorothermoplastic material comprises tetrafluoroethylene, hexafluoropropylene, vinylidene fluoride or any combination thereof.

8. The composite film of claim 1, wherein the composite film further comprises a second anti-reflective coating overlying a second surface of the substrate, wherein the second surface of the substrate is parallel to and opposite of the first surface of the substrate.

9. The composite film of claim 8, wherein the second anti-reflective coating comprises a fluorothermoplastic material, and an acrylated polydimethylsiloxane.

10. A composite film comprising:
a substrate; and
a first anti-reflective coating overlying a surface of the substrate,
wherein the first anti-reflective coating consists of:
a fluorothermoplastic material at a concentration of at least about 90.00 wt. % and not greater than about 99.50 wt. % for a total weight of the first anti-reflective coating; and
an acrylated polydimethylsiloxane at a concentration of at least about 0.10 wt. % and not greater than about 5.00 wt. % for a total weight of the first anti-reflective coating,
wherein the fluorothermoplastic material comprises fluoropolymer having a refractive index not greater than about 1.4, and
wherein the first anti-reflective coating has a thickness of at least about 50 nm.

11. The composite film of claim 10, wherein the composite film further comprises a haze of at least about 0.5%.

12. The composite film of claim 10, wherein the composite film further comprises a haze of not greater than about 2.0%.

13. The composite film of claim 10, wherein the composite film further comprises a reflectance of at least about 1.5% as measured at 550 nm.

14. The composite film of claim 10, wherein the composite film further comprises a reflectance of not greater than about 7.0% as measured at 550 nm.

15. The composite film of claim 10, wherein the composite film comprises a fluorothermoplastic material at a concentration of at least about 95.0 wt. % for a total weight of the first anti-reflective coating.

16. A method of forming the composite film of claim 1, wherein the method comprises:
providing a first anti-reflective coating formulation comprising an active coating mixture comprising a fluorothermoplastic material, and an acrylated polydimethylsiloxane, and a photo initiator;
applying the anti-reflective coating formulation to a substrate; and
drying the anti-reflective coating formulation to form a first anti-reflective coating overlying the substrate.

* * * * *